United States Patent [19]

Dianitsch

[11] Patent Number: 4,549,792
[45] Date of Patent: Oct. 29, 1985

[54] ADJUSTABLE NOSE PIECE AND INCORPORATING SUNGLASSES

[75] Inventor: Franz Dianitsch, Linz, Austria

[73] Assignee: Optyl Eyewear Fashion International Corporation, Norwood, N.J.

[21] Appl. No.: 362,297

[22] Filed: Mar. 26, 1982

[51] Int. Cl.[4] .................. G02C 5/08; G02C 1/00; G02C 5/12
[52] U.S. Cl. .................. 351/63; 351/88; 351/137
[58] Field of Search .............. 351/63, 87, 88, 131, 351/132, 136, 137, 138, 139

[56] References Cited

U.S. PATENT DOCUMENTS

| 666,927 | 1/1901 | Fincit . |
| 1,014,116 | 1/1912 | Brown . |
| 1,082,480 | 12/1913 | Cutler . |
| 1,278,417 | 9/1918 | Bader . |
| 1,609,477 | 12/1926 | King . |
| 1,789,937 | 1/1931 | Curran . |
| 1,965,277 | 7/1934 | Blase . |
| 1,968,142 | 7/1934 | Halikman . |
| 2,043,730 | 6/1936 | Blase . |
| 2,112,644 | 3/1938 | Bausch . |
| 3,394,980 | 7/1968 | Dym . |
| 3,515,467 | 6/1970 | Stewart ................... 351/137 |

FOREIGN PATENT DOCUMENTS 1401735  4/1965  France ................... 351/137

Primary Examiner—Rodney B. Bovernick
Attorney, Agent, or Firm—Fitch, Even, Tabin & Flannery

[57] ABSTRACT

An adjustable nose piece that is incorporable by sunglasses includes a bridge, nose pads and wires connecting the nose pads to respective rims of the sunglasses. The bridge may be hinged to provided a collapsible sunglasses. The wires include an intermediate portion unattached to the respective rim or nose pad. This free portion may be deformed to provide adjustment of the nose pads. The wires are strong enough for normal wear and use, and sufficiently ductile for adjustment of the nose pads. The wires are susceptible of repeated plastic deformations to allow successive adjustment.

7 Claims, 7 Drawing Figures

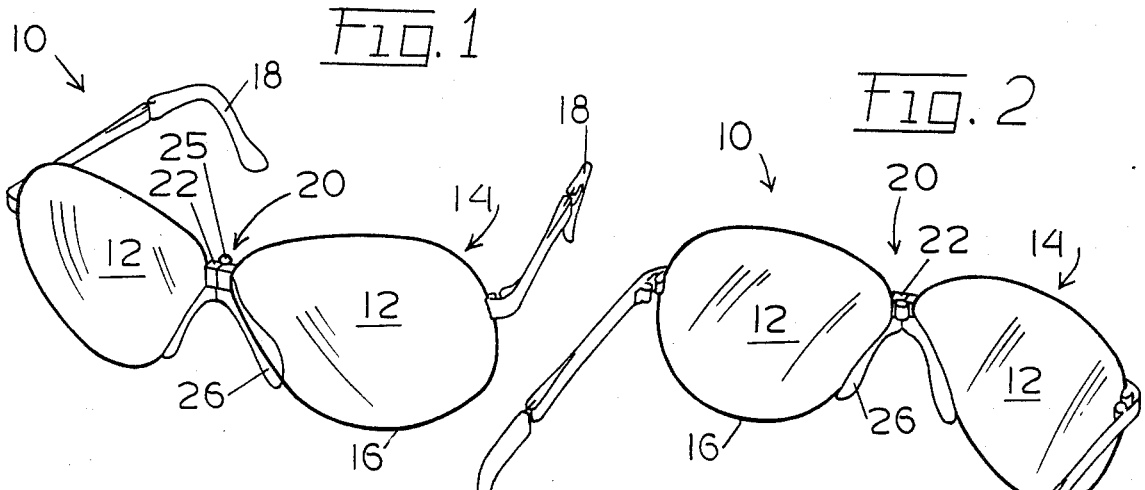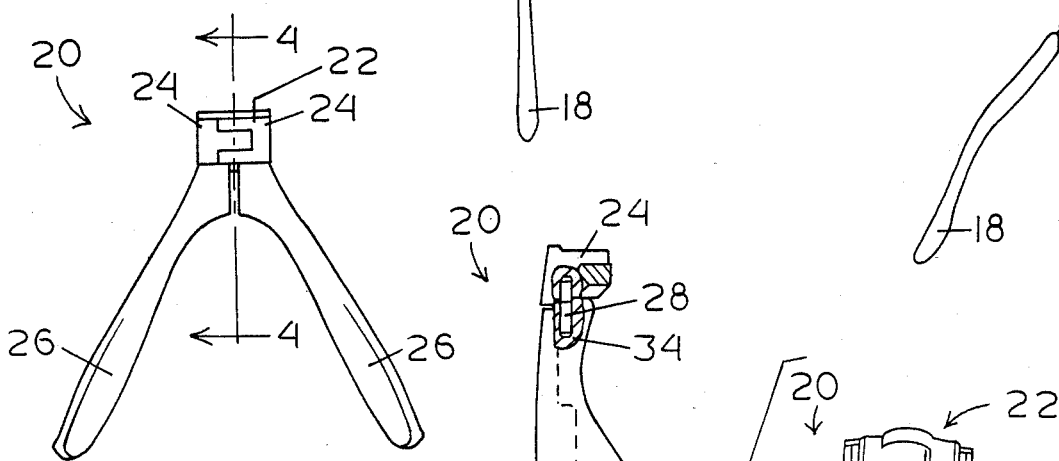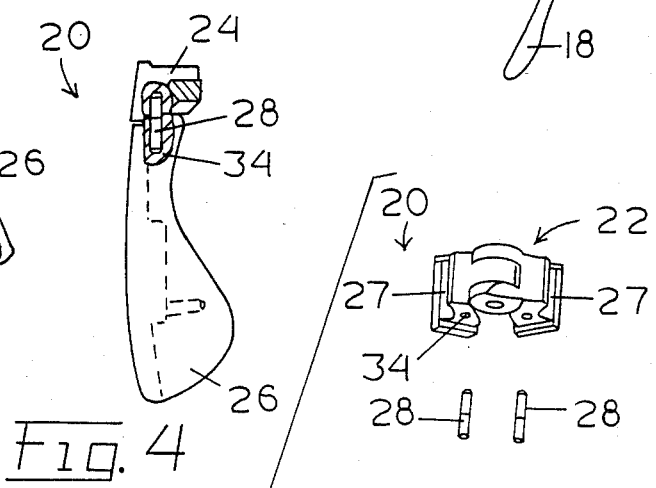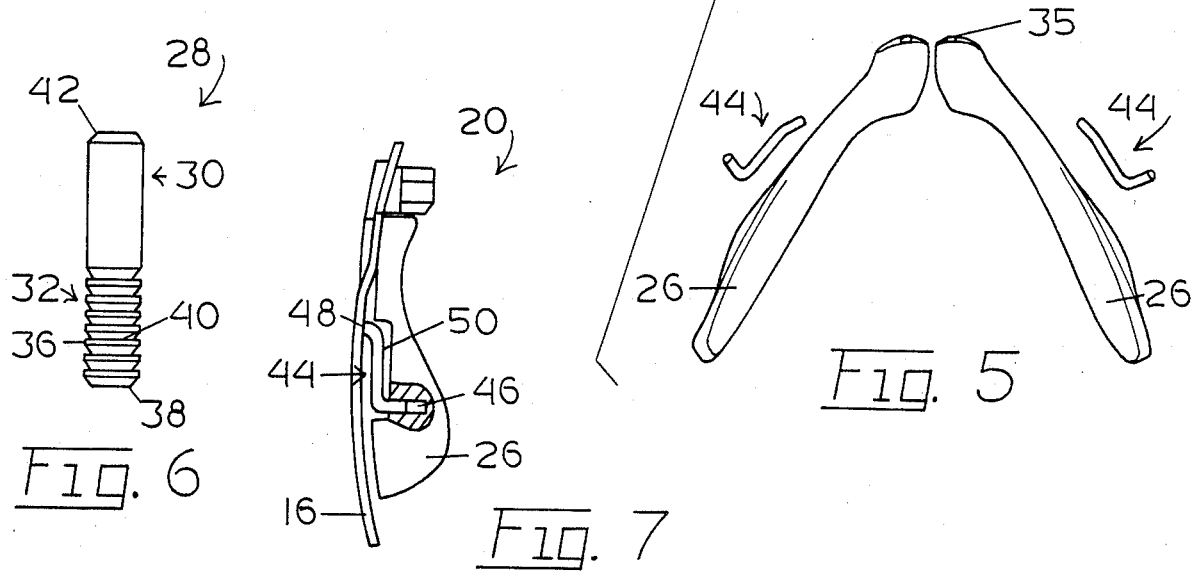

ADJUSTABLE NOSE PIECE AND INCORPORATING SUNGLASSES

BACKGROUND OF THE INVENTION

The present invention relates to sunglasses, and more particularly to sunglasses with an adjustable nose piece.

Sunglasses should be attractive as well as protective of the eyes. Additionally, sunglasses should fit the wearer appropriately and comfortably. Since the wearer's nose is commonly used to support sunglasses, often for hours at a time, components contacting the nose merit special consideration. In particular, commercially distributed sunglasses must contend with the variety of preferences and nose shapes of potential consumers.

To accommodate a broader spectrum of potential wearers, sunglasses have been provided with adjustable nose pieces. However, the mechanisms employed have been conspicuous or have otherwise detracted from the aesthetics of the sunglasses. Furthermore, the mechanisms have been cumbersome, costly and often not particularly comfortable. These problems are compounded where it is desired that sunglasses be collapsible.

It is known to connect a nose pad to a rim or other frame section of sunglasses by a wire which is capable of inelastic deformation. However, these wires are often unsightly and vulnerable to breakage, especially after repeated adjustments.

What is needed is a stylish adjustable nose piece and incorporating sunglasses. Additionally, such a nose piece adapted for collapsible sunglasses is sought.

SUMMARY OF THE PRESENT INVENTION

Sunglasses comprise a pair of viewing lenses, a frame having a pair of rims for supporting the lenses, temple means associated with such rim means for supporting the sunglasses when worn, and an adjustable nose piece for supporting the sunglasses on a wearer's nose and for joining the rims. The nose piece includes a bridge joining the rims and flexible nose pads for resting on the wearer's nose. Attachment means, such as pins inserted into the bridge and each pad secure the pads to the bridge. The nose piece also includes a pair of ductile wires capable of repeated plastic deformations without rupture. Each wire has one end portion attached to a respective nose pad and an opposite end bonded to a respective rim. The remaining intermediate portion can be plastically deformed to adjust the position of the respective nose pad relative to the respective rim.

The wire is positioned and shaped so that any deformation endured in the adjustment of the respective nose pad is distributed over a substantial length of the wire so that fatigue is not overly localized. Preferably, the intermediate portion is much longer than the distance between the respective nose pad and rim so that the nose pad can be rotated about its respective pin. Movement of the nose pad is constrained to rotations about the respective pin, which may be pivoted within the bridge. The wire limits the movement of the nose pad so that the pin remains within a respective hole in the bridge.

In a collapsible embodiment, the nose piece is hinged. Each nose pad is attached to one hinge member as well as to one rim so that folding the sunglasses does not disturb the relationship between each nose pad and the elements to which it is attached. The adjustable nose piece and incorporating sunglasses provide for a stylishly aesthetic sunglasses that can be securely and comfortably worn by a variety of users. In addition, the collapsible embodiment provides for such sunglasses which are conveniently stored or carried when not being worn.

BRIEF DESCRIPTION OF THE DRAWINGS

FIG. 1 is a front perspective view of sunglasses in accordance with the present invention.

FIG. 2 is a rear perspective view of the sunglasses of FIG. 1.

FIG. 3 is a front elevational view of a nose piece in accordance with the present invention.

FIG. 4 is a sectional view of the nose piece shown in FIG. 3 taken along line 4—4 of FIG. 3.

FIG. 5 is an exploded view of the nose piece of FIG. 3.

FIG. 6 is an enlarged view of one of the pins shown in FIG. 5.

FIG. 7 is side elevational view of part of a sunglasses rim with part of the nose piece of FIG. 3 attached thereto in accordance with the present invention.

DETAILED DESCRIPTION

In accordance with the present invention, sunglasses 10, illustrated in FIGS. 1 and 2, include a pair of viewing lenses 12, a frame 14 including a pair of rims 16 for supporting the lenses 12, temples 18 or related means connected to the frame 14 for supporting the sunglasses 10 when worn, and an adjustable nose piece 20. The nose piece 20 supports the sunglasses 10 on a wearer's nose and bridges the rims 16.

The nose piece 20 includes a bridge 22, which in the illustrated embodiment is hinged and includes two hinge members 24 pivotally connected about a hinge pin 25. Each hinge member 24 may have a vertically extending groove 27 for receiving a portion of the respective rim 16, which may be welded therein. Below the bridge 22 are flexible nose pads 26 which contact a nose when the sunglasses 10 are worn. The nose pads 26 are molded of relatively soft, flexible plastic to provide comfort to the wearer and support for the sunglasses 10.

Each nose pad 26 is linked to a respective hinge member 24 via a pin 28 or other attachment means. Each pin 28 has an upper portion 30 pivotally fitted within a hole 34 extending into the respective hinge member 24. Each pin 28 has a lower portion 32 secured within a hole 35 through the top of the respective nose pad 26, as shown in FIG. 4. To better secure the pin 28 within the soft plastic of the nose pad 26, the lower portion 32 of the pin 28 has circumferential ridges 36 which increase the frictional contact between the pin 28 and nose pad 26. As shown in FIG. 6, the ridges 36 are defined by a series of downwardly beveled portions 38. The downward beveling facilitates insertion, while the planar tops 40 of the portions 32 resist removal. The top 42 of the pin 28 may also be beveled to facilitate insertion into the respective hinge member 24. The upper portions 30 of the illustrated pins 28 are generally cylindrical and smooth to permit the upper portion 30 of each hinge pin 28 to rotate within its respective hole 34 so that each nose pad 26 can rotate relative to its respective hinge member 24.

Each nose pad 26 is linked to a respective rim 16 via a wire 44, as shown in FIG. 7. One end portion 46 of the wire 44 extends, preferably horizontally, into one edge of the nose pad 26 so that the respective hinge pin 28 is supported within the respective hinge member 24. The opposite end 48 of the wire 44 is connected, preferably by welding, to the respective rim 18. The remaining intermediate portion 50, which preferably extends upwardly from the inserted end portion 46 to the welded opposite end 48, may be deformed to adjust the location and orientation of the nose pad 26. Preferably, the intermediate portion 50 constitutes more than one half the length of wire 44. The wire 44 is strong enough to resist the normal stresses of wear and use so that the adjustment of the nose piece 20 is not readily altered inadvertently. On the other hand, the wire 44 is sufficiently ductile to be deformed manually or with the aid of a manual tool, such as thin nose pliers, so that the nose piece 20 can be adjusted to suit the taste and nose shape of the wearer. Furthermore, the wire 44 is capable of repeated plastic deformation without undue fatigue or rupture so that successive adjustments can be made.

In many prior sunglasses, a wire is incorporated which extends relatively directly from a rim to a nose pad. In the present embodiment, the length of the intermediate portion 50 is considerably greater than the distance between the rim 16 and the nose pad 26. In the illustrated embodiment, this length is at least an order of magnitude greater than the distance between the rim 16 and the nose pad 26, which are practically in contact. The wire 44 is positioned and shaped so that any deformation endured in the adjustment of the respective nose pad 26 is distributed over a substantial intermediate portion 50 of the wire 44 so that fatigue is not overly localized. Each nose pad 26 may be rotated with respect to its corresponding hinge member 24, the rotation resulting in a gentle twist about the axis of the intermediate portion 50 of the wire 44. The wire 44 is essentially invisible when the sunglasses 10 are worn so as not to detract from the aesthetics of the sunglasses 10.

As can be seen from FIGS. 1 and 2, the present invention provides an adjustable nose piece which integrates aesthetically into the novel sunglasses design. The arrangement is comfortable and permits collapsible sunglasses. However, the nose piece may also be incorporated in a non-collapsible design. Various modifications on the illustrated embodiment and other embodiments are possible within the spirit and scope of the present invention. Accordingly, the present invention is delimited only by the following claims and equivalents thereof.

What is claimed is:

1. Foldable sunglasses comprising:
a pair of viewing lenses;
a pair of rims for engaging and supporting respective said lenses, each rim including portions which extend adjacent a wearer's nose when the sunglasses are worn;
temple means associated with said rims for supporting said sunglasses when worn;
a hinge having hinge members pivotally connected to each other, each hinge member having means for engaging a respective said rim so that said hinge bridges said rims;
a pair of nose pads for resting on a wearer's nose;
attachment means for pivotally attaching each nose pad to a respective said hinge member; and
a pair of ductile wires capable of repeated plastic deformations without rupture, each wire having one end portion attached to a respective nose pad and an opposite end welded to a respective rim, each wire having an intermediate portion which can be plastically deformed to adjust the position of the respective nose pad relative to the respective rim.

2. In foldable sunglasses having a pair of viewing lenses, a pair of rims for engaging and supporting respective said lenses, each rim including portions which extend adjacent a wearer's nose when the sunglasses are worn, and temple means associated with said rim means for supporting said sunglasses when worn, a nose piece comprising a hinge having hinge members pivotally connected to each other, each hinge member having means for engaging a respective said rim so that said hinge bridges said rims, a pair of nose pads for resting on a wearer's nose, attachment means for pivotally attaching each nose pad to a respective said hinge member, and a pair of ductile wires capable of repeated plastic deformations without rupture, each wire having one end portion attached to a respective nose pad and an opposite end welded to a respective rim, each wire having an intermediate portion which can be plastically deformed to adjust the position of the respective nose pad relative to the respective rim.

3. The apparatus of claim 1 or 2 further characterized in that a vertical groove adapted for receiving a portion of a respective said rim is included in said means for engaging a respective said rim associated with each hinge member.

4. The apparatus of claim 1 or 2 further characterized in that said attachment means includes pins, each pin having an upper and a lower portion, said upper portion being secured within a downwardly oriented hole in a respective one of said hinge members and said lower portion being secured within a top portion of a respective said nose pad.

5. The apparatus of claim 4 further characterized in that said lower portions of said pins have circumferential ridges to increase the physical contact between each pin and the respective said nose pad.

6. The apparatus of claim 1 or 2 further characterized in that more than one half the length of each wire is included in said intermediate portion between said end portion and said opposite end of said wire.

7. The apparatus of claim 6 further characterized in that the end portion of each wire extends generally horizontally into said respective said nose pad, and the intermediate portion extends generally upwardly from said end portion to the respective said opposite end.

* * * * *

UNITED STATES PATENT AND TRADEMARK OFFICE
CERTIFICATE OF CORRECTION

PATENT NO. : 4,549,792
DATED : October 29, 1985
INVENTOR(S) : Dianitsch

It is certified that error appears in the above-identified patent and that said Letters Patent is hereby corrected as shown below:

In the References Cited: "Fincit" should read --Finch--.

Line 4 of the Abstract: "provided" should read --provide--.

Line 11 of the Abstract: "adjustment" should read --adjustments--.

Signed and Sealed this

Fourth Day of March 1986

[SEAL]

Attest:

DONALD J. QUIGG

Attesting Officer     Commissioner of Patents and Trademarks